United States Patent

Lobermeier et al.

[11] Patent Number: 6,098,954
[45] Date of Patent: Aug. 8, 2000

[54] VALVE-ACTUATING HANDLE WITH END-POSITION OVERRIDE

[75] Inventors: Hans Lobermeier, Menden; Hartwig Philipps-Liebich, Hemer, both of Germany

[73] Assignee: Friedrich Grohe AG & Co. KG, Hemer, Germany

[21] Appl. No.: 09/307,490

[22] Filed: May 10, 1999

[30] Foreign Application Priority Data

May 28, 1998 [DE] Germany ............ 198 23 801

[51] Int. Cl.[7] .................................................. G05D 23/13
[52] U.S. Cl. ........................................ 251/109; 236/12.22
[58] Field of Search ............................. 251/107, 109; 137/625.41; 236/12.16, 12.19, 12.2, 12.21, 12.22

[56] References Cited

U.S. PATENT DOCUMENTS

| | | |
|---|---|---|
| 4,232,817 | 11/1980 | Braukmann et al. ............ 236/42 |
| 4,304,256 | 12/1981 | Taiani ....................... 137/556.3 |
| 4,767,052 | 8/1988 | Kostorz . |

*Primary Examiner*—John Fox
*Attorney, Agent, or Firm*—Herbert Dubno

[57] ABSTRACT

A water valve has a fixed valve housing, a knob pivotal on the housing about a knob axis and formed with a radially throughgoing aperture, and an abutment projecting radially from the housing. The aperture passes the abutment on rotation of the knob on the housing about the knob axis. A pivot on the knob defines a rocker axis adjacent the aperture and substantially parallel to but offset from the knob axis. A rocker pivotal on the pivot about the rocker axis has an end displaceable radially through the aperture between an inner position engageable with the abutment on movement of the window past the abutment and a position not engageable with the abutment on such movement. A spring braced between the rocker and the knob urges the rocker into the inner position.

12 Claims, 4 Drawing Sheets

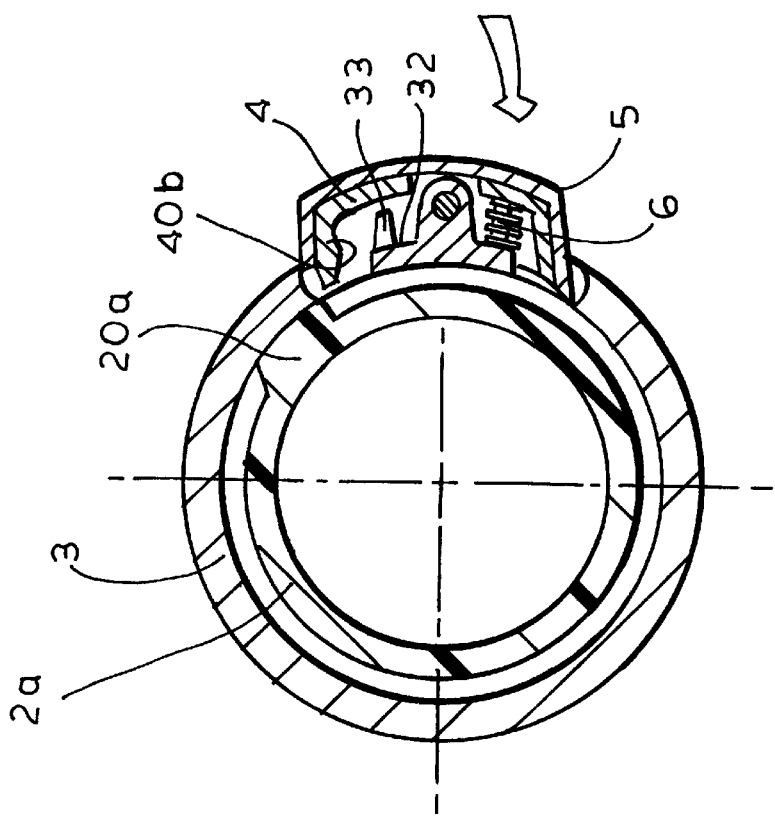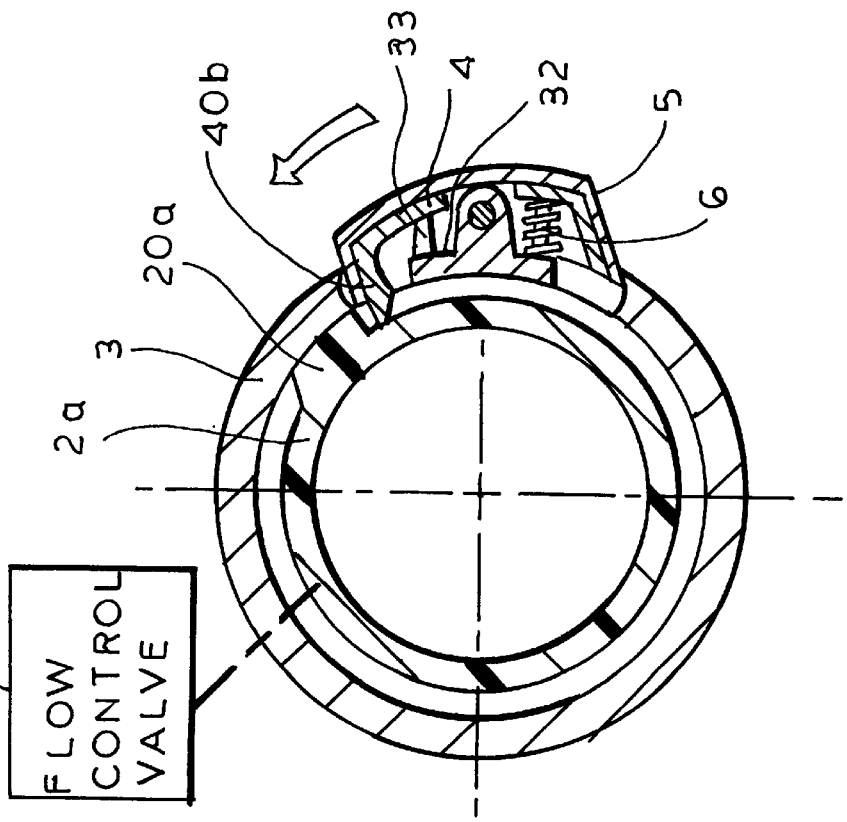

VALVE-ACTUATING HANDLE WITH END-POSITION OVERRIDE

FIELD OF THE INVENTION

The present invention relates to a valve-actuating handle. More particularly this invention concerns a handle for a flow-or temperature-control valve which has an end position that can be manually overridden.

BACKGROUND OP THE INVENTION

In order to prevent a temperature-control valve from being accidentally turned to a position in which it would deliver scalding water or to prevent a flow-control valve from being set in a position so far open that water is wasted, it is standard to provide an end stop that limits travel of the valve handle. Since there are however situations when scalding water and/or very heavy flow is desired, it is therefore also standard to provide an override mechanism so that the user can intentionally move past the normal end position.

As described in U.S. Pat. No. 4,767,052 and EP 0,232,454 such systems have a valve-actuating knob pivotal about and centered on an axis. A rocker is pivoted in turn on the knob about an axis that extends tangentially or secantally of the axis of the knob, so that the rocker itself extends parallel to the knob-rotation axis. An end of this rocker is depressed to move an abutment formed by the rocker on the knob out so it cannot engage an abutment formation on a sleeve or spindle carrying the knob.

Such a system is relatively effective but makes it difficult to design a compact knob and valve assembly. In addition accommodating the rocker requires that the entire knob assembly be relatively long, posing design constraints on the fixture.

OBJECTS OF THE INVENTION

It is therefore an object of the present invention to provide an improved valve actuator.

Another object is the provision of such an improved valve actuator which overcomes the above-given disadvantages, that is whose end-position override mechanism is relatively compact and easy to accommodate even in short valve assemblies.

SUMMARY OF THE INVENTION

A water valve has according to the invention a fixed valve housing, a knob pivotal on the housing about a knob axis and formed with a radially throughgoing aperture, and an abutment projecting radially from the housing. The aperture passes the abutment on rotation of the knob on the housing about the knob axis. A pivot on the knob defines a rocker axis adjacent the aperture and substantially parallel to but offset from the knob axis. A rocker pivotal on the pivot about the rocker axis has an end displaceable radially through the aperture between an inner position engageable with the abutment on movement of the window past the abutment and a position not engageable with the abutment on such movement. A spring braced between the rocker and the knob urges the rocker into the inner position.

Thus with this system the overridable end position is defined by engagement of the end of the rocker with the housing abutment, but tipping the rocker allows the knob to be turned further. Since the rocker rotates about an axis parallel to that of the knob, it can be made to fit snugly in a relatively low-profile knob for a very neat and compact assembly. None of the rocker structure need occupy space inside the knob, making it possible for this part to be quite compact and hug the housing tightly.

According to the invention the knob is formed with one such radially throughgoing aperture to each side of the pivot. The rocker is so constructed that it can be mounted on the pivot to engage its end through either of the apertures. Thus it is possible to use the exact same knob for each side of a pair of faucets, merely having to vary the unseen rocker structure and the form of the abutment on the valve housing in a system where one knob is turned clockwise and the other counterclockwise, as for instance where the flow-control knob is coaxial with the temperature-control knob.

The pivot in accordance with the invention is formed as a lug projecting radially of the knob and the rocker has a pair of side walls flanking the lug. The knob is cup-shaped and has an outer surface formed generally as a body of revolution centered on the knob axis. The rocker having an outwardly concave curved outer face.

The pivot includes a pin projecting through the lug and into the walls of the rocker. The rocker includes a core body formed with the walls and a jacket covering the core body. This cap is glued on the core body. The rocker substantially covers and closes both the apertures. The resultant assembly is therefore very neat.

Furthermore in accordance with the invention the knob is formed with a pair of recesses angularly flanking the pivot. The spring is mounted in one of the recesses. Each of the recesses is provided with a bump and the spring is a coil spring fitted over the respective bump. It is also possible for the spring to be an elastomeric spring body complementarily fitting one of the recesses and engaged between the rocker and the knob.

The rocker end is formed with an angled camming surface extending nonradially of the knob axis and engageable with the abutment and the rocker projects radially outward from the knob.

BRIEF DESCRIPTION OP THE DRAWING

The above and other objects, features, and advantages will become more readily apparent from the following description, reference being made to the accompanying drawing in which.

Figure 2:
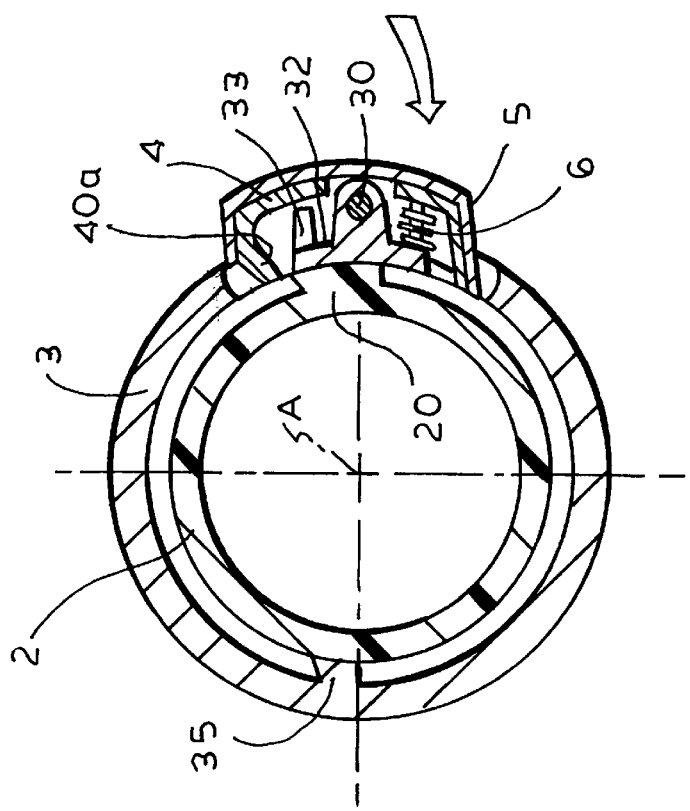
FIGS. 2 and 3 are partly diagrammatic sections through one of the knob subassemblies of the valve in the normal and override positions, respectively.
Figure 3:
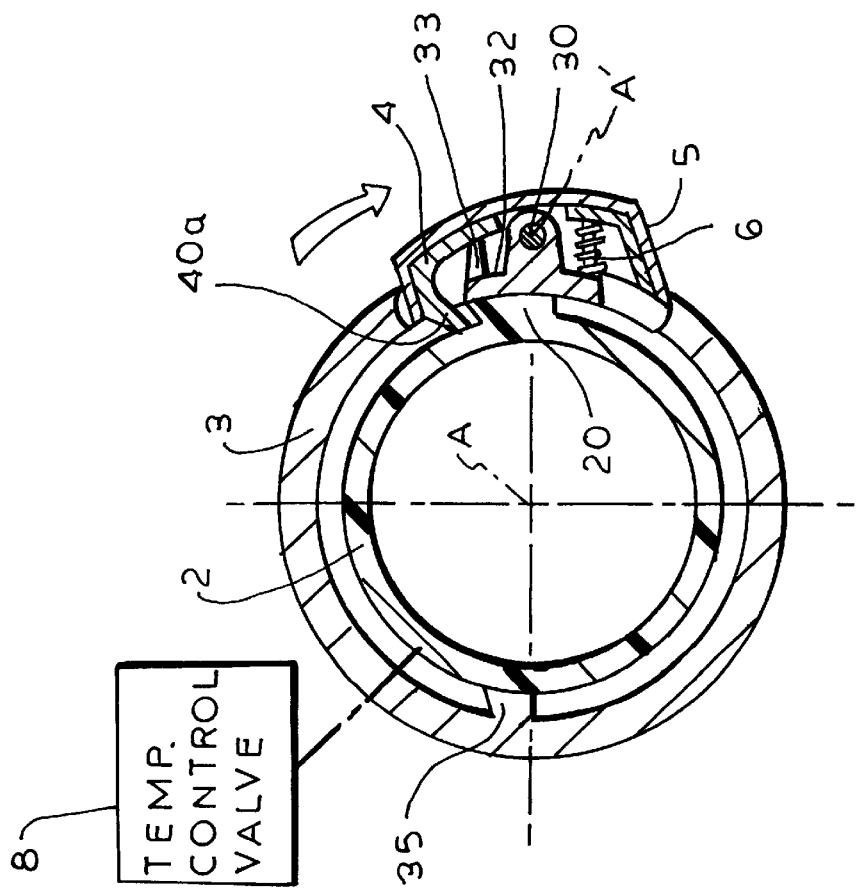
Figure 6:
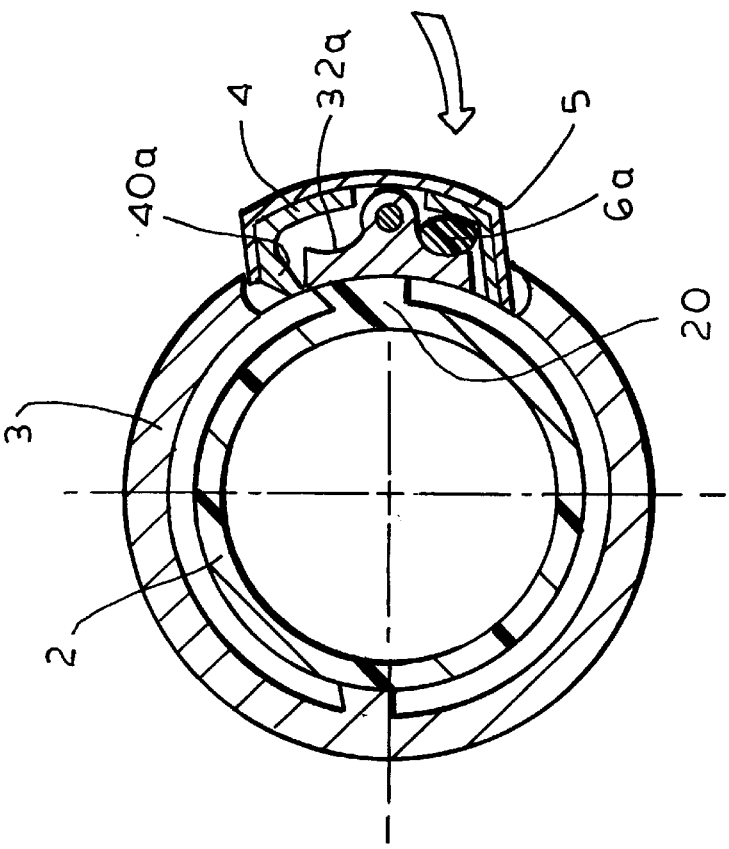
Figure 7:
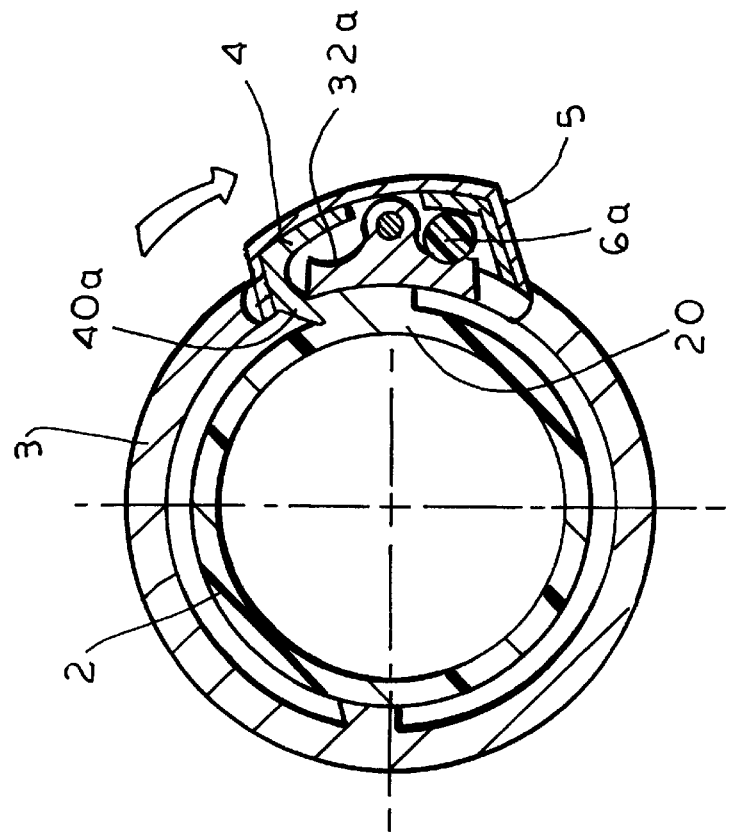

FIGS. 4 and 5 are views like FIGS. 2 and 3 of the other knob subassembly of the valve; and FIGS. 6 and 7 are views showing a variation on the structure of respective FIGS. 2 and 3.

SPECIFIC DESCRIPTION

Figure 1:
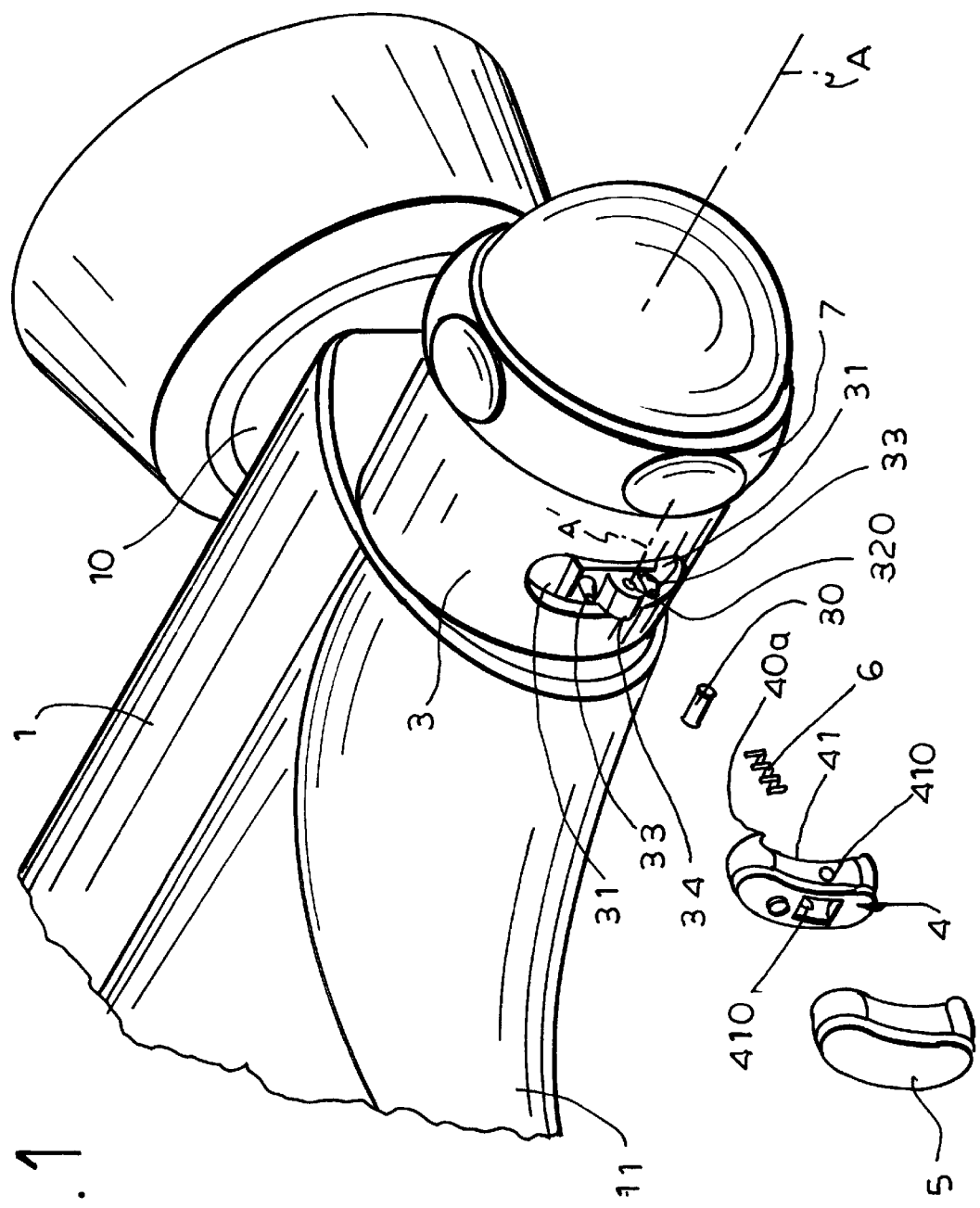
FIG. 1 is a perspective and partly exploded view of a valve assembly according to the invention.

As seen in FIG. 1 a valve assembly has a housing 1 containing a temperature-control valve 8 shown schematically in FIG. 2 and a flow-control valve 9 shown schematically in FIG. 4. A right-hand cold-water inlet 10 is shown; the hot-water inlet connection is identical but not illustrated. The valve housing 1 forms an outlet spout 11 from which water issues at a temperature determined by the valve 8 and a rate of flow determined by the valve 9.

As shown also in FIGS. 2 and 3, the housing 1 has for the valve 8 a nonrotating cylindrical stem or sleeve 2 centered on an axis A and carrying an input member formed by a cylindrical knob body 3 rotatable coaxially with the sleeve 2. The knob body 3 is formed with a radially inwardly projecting and axially extending abutment ridge 35 of right-trapezoidal section with an undercut leading edge and a perpendicular rear edge. The housing sleeve 2 is similarly formed with a radially outwardly projecting and axially extending abutment ridge 20 that is angularly engageable with the ridge 35. Thus under any circumstances rotation of the knob body 3 on the housing sleeve 2 is limited to somewhat less than 360°, from a position with the radially extending rear faces of the ridges 20 and 35 engage each other to positions with the angled front faces of the ridges 290 and 35 engaging and indeed hooked in each other.

The knob 3 is formed with a radially projecting pivot lug 34 formed with a throughgoing hole 320 centered on an axis A' extending parallel to the axis A and has a small outer surface 32 to each angular side of the lug 34 which is formed with a radially outwardly projecting stop pin or bump 33. A rocker 4 has side walls 41 formed with throughgoing holes 410 and a pin 30 engages through these holes 410 and the hole 320 for pivoting of the rocker 4 about the axis A'. A small compression spring 56 is engaged over one of the bumps 33 and bears radially of the axis A outward on the respective side of the rocker 4. A metal jacket 5 fits over the rocker 4 to give it an attractive appearance, make it more durable, and completely fill the angularly elongated slot in the knob 3 in which it sits. In addition a part-spherical end cap 7 which can match the decor of the valve housing 1 is fitted to the end of the knob body 3.

The knob 3 is formed to each side of each surface 32 with a radially throughgoing aperture or hole 31 and the rocker 4 has at one end an extension or tooth 40a whose inner face or lank is angled, like the inclined face of the ridge 20, so that it can catch and engage this face of the ridge 20. The outer face of the tooth 40a is also angled so that when the knob 3 is rotated counterclockwise as shown in FIGS. 2 and 3, the ridge 20 will cam out the tooth 40a.

This system functions as follows:

Under normal circumstances the rocker 4 is in the position of FIG. 2 with its nose 40a projecting inward so it can engage the ridge 20, that is the inner edge of the nose 40a lied on an imaginary cylinder centered on the axis A and smaller than an imaginary cylinder centered on the axis A and running along the outer face of the ridge 20. Thus the knob 3 can be rotated through about 180°, between a position corresponding to cold water only with the back faces of the ridges 35 and 20 engaging each other to a position producing warm water at about 37° C. which is warm enough for washing but not harmful. The tooth 40a will engage the ridge 20 in this latter intermediate position and prevent further clockwise movement of the knob 3.

When, however, the rocker 4 is tipped back as shown in FIG. 3 by radial inward pressure on its side corresponding to the spring 6, the tooth 40a is retracted radially outward so that it clears the ridge 20 when the knob 3 moves it past this ridge 20. Thus the knob 3 can be moved further toward the hot position, allowing the spout 11 to emit, if desired, hot water with no admixture of cold water. When rotated counterclockwise back into the starting position, the angled outer face of the tooth 40a will engage the back edge of the ridge 20 and cam out the rocker 4, allowing it to move smoothly back into its starting position. Thus the rocker 4 need not be actuated to move back into the normal lower range from the override upper range.

FIGS. 4 and 5 show how the same knob structure can be effective on the other side of the housing 1. The only difference here is that the support sleeve 2a has a ridge 20a formed oppositely with respect to its angled and radial faces and the tooth 40b of the rocker 4 has a perpendicular outer face and an outwardly inclined inner face, not the inclined inner and outer faces as shown in FIGS. 2 and 3. Thus this arrangement will work on counterclockwise rotation of the knob body 3, which is identical to the body 3 of FIGS. 2 and 3, with the perpendicular outer face engaging the perpendicular side face of the ridge 20a to limit further rotation unless the rocker 4 is actuated to raise the tooth 40b. On reverse rotation after override, the angled inner edge of the ridge 20a and the angled inner face of the tooth 40b will cam out the rocker 4 to allow it to move back into the starting position without special actuation.

In FIGS. 6 and 7 a structure identical to that of FIGS. 2 and 3 is shown except that the spring-centering and stop bumps 33 are eliminated and the coil spring 6 is replaced by a circular-section elastomeric spring block 6a. This system functions identically to that of FIGS. 2 and 3.

We claim:

1. A water valve comprising:

a fixed valve housing;

a knob pivotal on the housing about a knob axis and formed with a radially throughgoing aperture;

an abutment projecting radially from the housing, the aperture passing the abutment on rotation of the knob on the housing about the knob axis;

a pivot on the knob defining a rocker axis adjacent the aperture and substantially parallel to but offset from the knob axis;

a rocker pivotal on the pivot about the rocker axis and having an end displaceable radially through the aperture between an inner position engageable with the abutment on movement of the window past the abutment and a position not engageable with the abutment on such movement; and a spring braced between the rocker and the knob and urging the rocker into the inner position.

2. The water valve defined in claim 1 wherein the knob is formed with one such radially throughgoing aperture to each side of the pivot, the rocker being so constructed that it can be mounted on the pivot to engage its end through either of the apertures.

3. The water valve defined in claim 1 wherein the pivot is formed as a lug projecting radially of the knob and the rocker has a pair of side walls flanking the lug.

4. The water valve defined in claim 3 wherein the knob is cup-shaped and has an outer surface formed generally as a body of revolution centered on the knob axis, the rocker having an outwardly concave curved outer face.

5. The water valve defined in claim 3 wherein the pivot includes a pin projecting through the lug and into the walls of the rocker, the rocker including a core body formed with the walls and a jacket covering the core body.

6. The water valve defined in claim 5 wherein the cap is glued on the core body.

7. The water valve defined in claim 1 wherein the knob is formed with a pair of recesses angularly flanking the pivot, the spring being mounted in one of the recesses.

8. The water valve defined in claim 7 wherein each of the recesses is provided with a bump, the spring being a coil spring fitted over the respective bump.

9. The water valve defined in claim 7 wherein the spring is an elastomeric spring body complementarily fitting one of the recesses and engaged between the rocker and the knob.

10. The water valve defined in claim 1 wherein the knob is formed with one such radially throughgoing aperture to each side of the pivot, the rocker substantially covering and closing both the apertures.

11. The water valve defined in claim 1 wherein the rocker end is formed with an angled camming surface extending nonradially of the knob axis and engageable with the abutment.

12. The water valve defined in claim 1 wherein the rocker projects radially outward from the knob.

* * * * *